Figure 1:
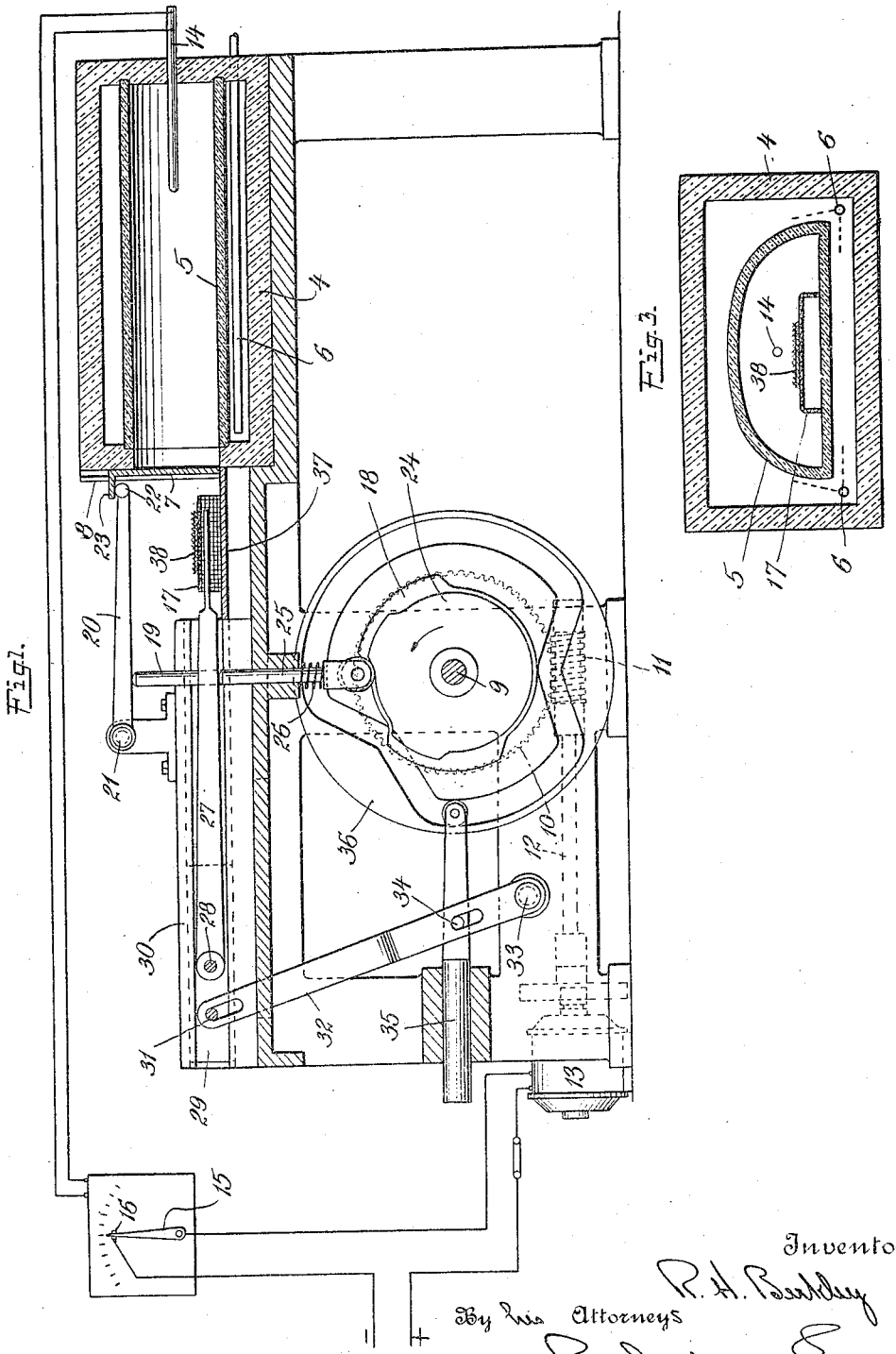

R. H. BERKLEY.
APPARATUS FOR TREATING LINK MESH MADE FROM SOLDER CORE WIRE.
APPLICATION FILED JUNE 5, 1918.

1,305,052.

Patented May 27, 1919.
2 SHEETS—SHEET 1.

R. H. BERKLEY.
APPARATUS FOR TREATING LINK MESH MADE FROM SOLDER CORE WIRE.
APPLICATION FILED JUNE 5, 1918.

1,305,052.

Patented May 27, 1919.
2 SHEETS—SHEET 2.

Inventor
R. H. Berkley,
By his Attorneys

UNITED STATES PATENT OFFICE.

RICHARD HATLEY BERKLEY, OF PLAINVILLE, MASSACHUSETTS, ASSIGNOR TO WHITING & DAVIS COMPANY, A CORPORATION OF NEW YORK.

APPARATUS FOR TREATING LINK MESH MADE FROM SOLDER-CORE WIRE.

1,305,052.  Specification of Letters Patent.  Patented May 27, 1919.

Application filed June 5, 1918. Serial No. 238,358.

*To all whom it may concern:*

Be it known that I, RICHARD H. BERKLEY, a citizen of the United States, residing at Plainville, in the county of Norfolk, State of Massachusetts, have invented certain new and useful Improvements in Apparatus for Treating Link Mesh Made from Solder-Core Wire; and I do hereby declare the following to be a full, clear, and exact description of the invention, such as will enable others skilled in the art to which it appertains to make and use the same.

This invention is directed to the provision of an improved method and apparatus for the treatment of link-mesh made from wire having a solder-core, which mesh is so extensively used in the manufacture of hand bags.

The type of mesh which is most extensively used is ring mesh consisting of a multiplicity of rings each interlinked with four other rings. These rings are made from wire having a core of solder by cutting off suitable lengths of the wire, bending each length of wire to form a staple, passing the legs of the staple through rings of the mesh and then forming the staple into a ring by bringing its ends together. When the manufacture of a piece of mesh in this manner has been completed, the piece is subjected to a heat treatment which softens the solder-core of the rings sufficient to cause solder at the ends of the piece of wire to pass out into the minute spaces between the ends of the pieces and fill those spaces, thus practically welding the ends of the rings together and making them continuous unbroken rings. It is of the utmost importance that this heat treatment of the pieces of mesh be conducted with great care and precision. If the heat treatment be discontinued too soon, or if it be conducted at too low a temperature, the solder will not run out into the joints in the rings in sufficient quantity, the joints in the rings will show in the completed mesh and the mesh will be of insufficient strength. On the other hand, if the mesh be subjected to the heat treatment longer than is necessary, or if it be conducted at too high a temperature, the solder will run-out too freely, forming small lumps or projections at the joints of the rings, and in some cases forming a rigid connection between two or more rings with the result that the mesh loses some of its flexibility and the desirable uniform appearance.

The operation of subjecting such solder-core mesh to heat treatment has heretofore been largely or entirely a manual operation requiring training and skill on the part of the operator and characterized by a lack of the unformity and perfection so desirable in such mesh which is used primarily in jewelry work and in which the highest degree of perfection is constantly sought.

The present invention is directed to the provision of a method and apparatus whereby the heat treatment of such mesh may be performed with the highest degre of accuracy and uniformity, resulting in the production of mesh consisting of links whose joints are completely filled with solder from the core of the wire and wholly free both from lumps or projections of solder at the joints and links which are rigidly connected by minute drops of solder. In accordance with the invention, the pieces of mesh are subjected to heat treatment in a furnace which is maintained always at a predetermined temperature which has been found in practice to be the correct temperature, and they are kept in the furnace for a predetermined length of time so that all of them are treated alike and lack of uniformity necessarily incident to a manual control of the operation is eliminated. To this end, a furnace is employed and in conjunction therewith an automatically operated mechanism for placing the pieces of mesh within the furnace, holding them there for a predetermined length of time, and then withdrawing them. The furnace is preferably provided with a door to reduce the escape of heat therefrom and this door is also operated by the automatic mechanism to open it to permit of insertion of a piece of mesh and close it immediately after the mesh has been inserted in the furnace, and to again open and close it before and after the withdrawal of each piece of mesh from the furnace. In order to insure that the furnace will always be maintained at the desired temperature, the mechanism for inserting pieces of mesh into the furnace and withdrawing them therefrom is placed under the control of thermometric apparatus which permits of operation of the mechanism for inserting and withdrawing the pieces of mesh only when the temperature within the furnace is at a predetermined point or within certain narrow limits of variation. Preferably the pieces of mesh are placed upon a foraminated support so that the heat of the furnace may be applied to the piece of mesh at practically all points thereon, and the automatic mechanism is arranged to raise the support with the piece of mesh thereon, and insert it in the furnace, and after the completion of the heat treatment, to withdraw the support with the piece of mesh thereon from the furnace.

Figure 2:
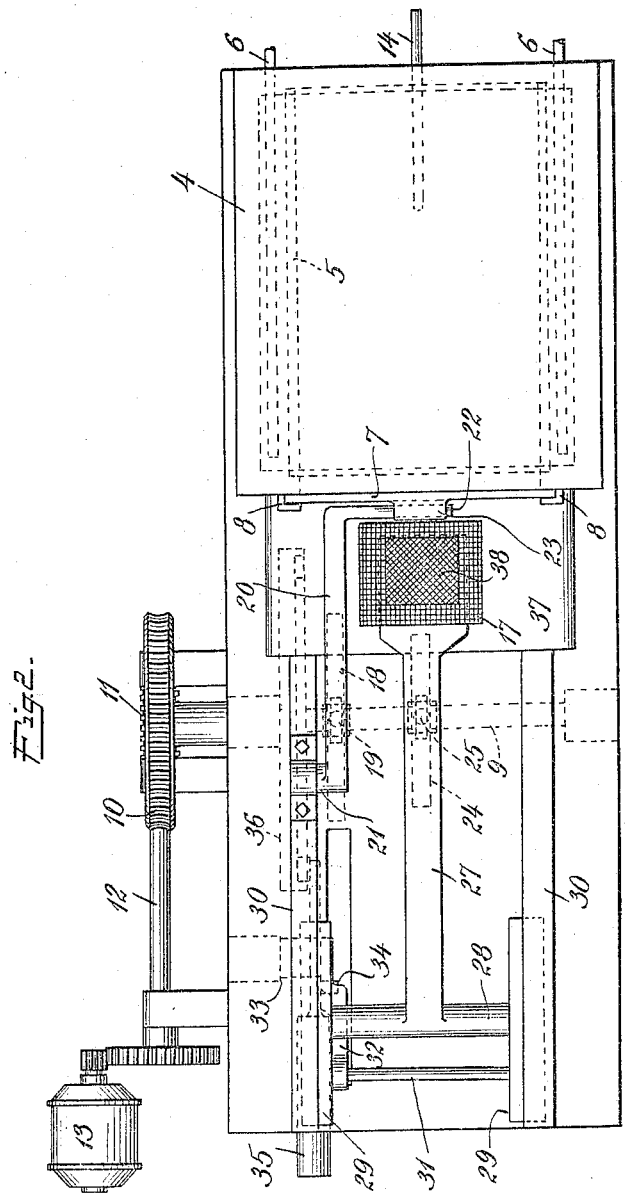

The features of the invention will be better understood by reference to the following description of an apparatus which may be conveniently employed in the practice of the invention, which apparatus is illustrated in the drawings annexed hereto. In these drawings, Figure 1 is a central section of the furnace apparatus; Fig. 2 is a plan view of the same, and Fig. 3 is a transverse section of the furnace.

Referring to the drawings, 4 indicates a muffle furnace of any suitable construction. It is shown as made of a refractory material, having a muffle 5 mounted within it and provided with gas burners 6 for supplying the requisite degree of heat. The entrance to the muffle is provided with a door 7 which is movable vertically in ways 8 arranged at opposite sides of the entrance. The insertion of the pieces of mesh within the furnace and their removal therefrom is effected by a power driven shaft 9. On this shaft is a worm wheel 10 which meshes with a worm 11 on a power shaft 12 driven by an electric motor 13. The operation of the motor 13 is controlled by the temperature within the furnace. For this purpose a telethermometer 14 is provided projecting within the muffle of the furnace and arranged to control the position of a movable indicator 15 whose position controls the circuit of the motor 13. In the drawings the indicator 15 and a contact 16 with which it coacts, are shown as connected in one side of the circuit of the motor 13, but it will be understood that these contacts may control a relay in the motor circuit instead of being directly connected in the circuit, so that only the current of a battery will pass through the contacts 15 and 16 instead of the current supplied to the motor 13. The indicator 15 may move on either side of the contact 16 and does so move as the temperature within the furnace rises above and falls below a predetermined temperature which has been found in practice to give the best results in the heat treatment of the mesh.

For the support of the mesh during the heat treatment I prefer to employ a support of woven wire fabric such as is shown at 17. This preferably consists of a rectangular piece of fabric having portions at the lateral edges thereof bent downwardly so that the body of the support will stand above the surface upon which the support is placed to give better access of the heat to the mesh on the foraminated support and provide a space into which a tool may be inserted to lift the support and place a piece of mesh thereon.

The automatic means for inserting the piece of fabric in the furnace and withdrawing it therefrom includes power actuated devices for opening and closing the door 7 of the furnace, for raising and lowering the support 17, and for moving the support 17 into and out of the furnace, these several movements being arranged to take place in a prescribed order. On the shaft 9 is a cam 18 and a roller on the lower end of a rod 19 runs on the periphery of this cam, the roller being held in engagement with the cam by a spring coiled on the rod. The upper end of rod 19 engages an arm 20 pivotally mounted at 21 upon the frame of the machine and having its free end bent laterally as shown at 22 and extending under a projection 23 on the door 7 of the furnace. The shaft 9 also carries a cam 24 which engages a roller carried by the lower end of a rod 25, the roller on this rod being also held in engagement with its cam by a spring 26 coiled on the rod. The upper end of the rod 25 engages an arm 27 which is pivotally mounted at one end upon a shaft 28 carried by slides 29 adapted to slide back and forth in grooves formed in ways 30 mounted on the frame of the machine. The slides 29 are also connected by a rod 31 which passes through a slot in a lever 32 whose lower end is pivoted at 33 upon the frame of the machine. The lever 32 has a second slot therein which receives a stud 34 upon a slide rod 35 adapted to reciprocate in a bearing formed on the frame of the machine. The end of the slide rod 35 carries a roller which lies within the cam groove of a cam 36 mounted on the shaft 9.

The support 17 rests normally upon the hearth or front plate 37 of the furnace whose surface is in the plane of the bottom of the muffle 5. The forward end of the arm 27 is flattened as shown in Figs. 1 and 2 and approximates in size, the size of the horizontal portion of the support 17.

In operation the support 17 is placed in position upon the hearth 37 and a piece of solder-core mesh 38 is laid upon the surface of the support. The circuit of the motor 13 is then closed to operate the motor to drive shaft 9 in the direction indicated by the arrow on Fig. 1. By reason of the provision of the thermometric controlling devices for the motor 13, that motor will operate only in the event that the temperature within the furnace is within the desired relatively narrow limits. Departure from this desired temperature either below or above it will preclude operation of the apparatus by the motor 13. With the motor in operation driving shaft 9 in the direction of the arrow, one of the projections on cam 18 operates through the rod 19 and arm 20 to raise the door 7 of the furnace in the ways 8 to the open position. At substantially the same time one of the projections on the cam 24 operates through the rod 25 to raise the free end of the arm 27, carrying it into engagement with the underside of the support 17 and lifting the support and the piece of mesh 38 thereon. Immediately thereafter the cam 36 operates through the rod 35, lever 32, slides 29 and shaft 28 to move arm 27 and the support 17 and the piece of mesh carried thereby forward into the furnace. As this forward movement of arm 27 is completed the end of the projection on cam 24 passes under the roller on rod 25 resulting in lowering rod 25 and the free end of arm 27 until the support 17 is deposited upon the bottom of the muffle 5 of the furnace and the end of arm 27 is out of engagement with the support 17. Then the cam 36 operates on slide rod 35 to move the arm 27 backward carrying its free end back out of the furnace. As the free end of the arm is withdrawn from the furnace, the end of the projection on cam 18 comes under its coacting roller resulting in the lowering of the door 7 to close the furnace. The shaft continues to rotate at uniform velocity measuring the time interval during which it is desired to have the piece of mesh 38 within the furnace and subjected to the heat treatment. At the end of this period of time the second projection on the cam 18 operates to open the door 7, and the second dip of the cam groove of cam 36 operates to move the free end of the arm 27 into the furnace. This time the free end of the arm 27 is moved into the furnace in the lower of its two positions and it passes under the horizontal portion of the support 17. As it reaches the end of its inward movement the second projection on cam 24 raises the free end of the arm causing it to lift the support 17 and the piece of mesh carried by it from the floor of the furnace, and the cam 36 then retracts the arm 27 out of the furnace. At the conclusion of this outward movement the ends of the projections on cams 24 and 18 come under their respective rollers, resulting in the lowering of the free end of arm 27 and closing of the door 7. The piece of heat treated mesh 38 may then be removed from the support 17 and another piece to be treated may be substituted for it.

The heat treatment of the pieces of mesh may be continued in this manner, the sole duty of the operator being to remove the treated pieces from the support 17 and to place the ones to be treated thereon. The time during which the pieces remain in the furnace is free from the control of the operator and is therefore the same in all instances. Furthermore, the regulation of the temperature of the heat treatment is taken from the control of the operator as the mechanism is so arranged that it may be operated only when the temperature within the furnace is within such narrow limits of variation as have been found in practice to insure the best results with respect to the period of time in which the mechanism is arranged to maintain the pieces of mesh in the furnace. Therefore the factors of the heat treatment which so largely determine the character of the treatment and which heretofore have been liable to variation by being subject to the control and judgment of the operator, are made definite and uniform; and as a result, uniformity and a high degree of perfection in the heat treating operation are obtained, it being a characteristic of the method and apparatus of this invention that the solder-core within the wire of the links is softened sufficient to insure complete closure of the joints of all of the rings, but not enough to result in too free a flow of the solder causing small lumps to be raised at the joints of the rings and the dropping of particles of molten solder from one ring to another.

I claim:

1. Apparatus for treating pieces of link-mesh made of solder-core wire to close the joints of the links with solder from the core of the wire, comprising the combination of a furnace and power actuated devices for depositing pieces of mesh successively upon the interior of the furnace, releasing each piece to allow it to remain within the furnace a predetermined length of time, and, after each piece has remained within the furnace for the predetermined length of time, lifting it from its position within the furnace and carrying it to the exterior of the furnace.

2. Apparatus for treating pieces of link-mesh made of solder-core wire to close the joints of the links with solder from the core of the wire, comprising the combination of a furnace, power-actuated devices for depositing pieces of mesh within the furnace successively and removing them therefrom after they have remained within the furnace equal and predetermined periods of time, and means for permitting operation of the power actuated devices only when the temperature within the furnace is within prescribed limits.

3. Apparatus for treating pieces of link-mesh made of solder-core wire to close the joints of the links with solder from the core of the wire, comprising the combination of a furnace, a support for a piece of link mesh, and power actuated devices for lifting the support with a piece of mesh thereon, depositing the support and piece of mesh thereon within the furnace, and withdrawing the support and the piece of mesh thereon from the furnace after they have remained therein for a predetermined length of time.

4. Apparatus for treating pieces of link-mesh made of solder-core wire to close the joints of the links with solder from the core of the wire, comprising the combination of a furnace, a door for the furnace, and power actuated devices for opening the door of the furnace, inserting a piece of mesh within the furnace, closing the door of the furnace and, after the piece of mesh has remained within the furnace for a predetermined length of time, opening the door of the furnace, withdrawing the piece of mesh therefrom, and again closing the door.

5. Apparatus for treating pieces of link-mesh made of solder-core wire to close the joints of the links with solder from the core of the wire, comprising the combination of a furnace, a support for a piece of link-mesh, power actuated devices for moving the support and the piece of mesh thereon within the furnace, and after they have remained therein for a predetermined length of time, withdrawing them from the furnace, and means for precluding operation of the power actuated devices except when the temperature within the furnace is within predetermined limits.

6. Apparatus for treating pieces of link-mesh made of solder-core wire to close the joints of the links with the solder from the core of the wire, comprising the combination of a furnace, a support for a piece of link-mesh, and power actuated devices for lifting the support with the piece of mesh thereon, moving it within the furnace, depositing it upon the floor of the furnace, and after the piece of mesh has remained within the furnace a predetermined time, lifting the support and withdrawing it from the furnace.

7. Apparatus for treating pieces of link-mesh made of solder-core wire to close the joints of the links with solder from the core of the wire, comprising the combination of a furnace, a support for a piece of link-mesh, power actuated devices for lifting the support with the piece of mesh thereon, moving it within the furnace, depositing it upon the floor of the furnace, and after the piece of mesh has remained within the furnace a predetermined time, lifting the support and withdrawing it from the furnace, and means for preventing operation of the power actuated devices except when the temperature within the furnace is within predetermined limits.

8. Apparatus for treating pieces of link-mesh made of solder-core wire to close the joints of the links with solder from the core of the wire, comprising the combination of a furnace, a movable door for the furnace, a support for a piece of link-mesh, power actuated devices for lifting the support and the piece of mesh thereon and opening the door of the furnace, inserting the support within the furnace and closing the door of the furnace, and after the support with the piece of mesh thereon has remained within the furnace a predetermined time, opening the door of the furnace, withdrawing the support, and then closing the door.

9. Apparatus for treating pieces of link-mesh made of solder-core wire to close the joints of the links with solder from the core of the wire, comprising the combination of a furnace, a support for a piece of mesh having supporting members at its sides, an arm, and power actuated devices for raising the arm under the support to lift the support, and a piece of mesh thereon for lowering the arm to deposit the support and the piece of mesh thereon upon the bottom of the furnace and for moving the arm in the direction of its length to carry the support into and out of the furnace.

10. Apparatus for treating pieces of link-mesh made of solder-core wire to close the joints of the links with solder from the core of the wire, comprising the combination of a furnace, a movable door for the furnace, a support for a piece of mesh having supporting members at its sides, an arm, power actuated devices for raising the arm under the support to lift the support and the piece of mesh thereon, for lowering the arm to deposit the support and the piece of mesh thereon upon the bottom of the furnace, and for moving the arm in the direction of its length to carry the support into and out of the furnace, and power actuated devices for opening and closing the door of the furnace.

In testimony whereof I affix my signature.

RICHARD HATLEY BERKLEY.

Copies of this patent may be obtained for five cents each, by addressing the "Commissioner of Patents, Washington, D. C."